United States Patent [19]

Dumas et al.

[11] Patent Number: 5,762,692

[45] Date of Patent: Jun. 9, 1998

[54] EVAPORATIVE EMISSIONS CONTROL SYSTEM FOR AUTOMOTIVE VEHICLE

[75] Inventors: James T. Dumas, Ferndale; Philip Jeffrey Johnson, Ann Arbor, both of Mich.

[73] Assignee: Ford Motor Company, Dearborn, Mich.

[21] Appl. No.: 725,800

[22] Filed: Oct. 4, 1996

[51] Int. Cl.⁶ ............................................. B01D 53/04
[52] U.S. Cl. .......................... 96/141; 96/144; 96/147; 55/320; 55/460
[58] Field of Search ........................ 55/337, 459.1, 55/460; 96/108, 130, 139–141, 144, 147

[56] References Cited

U.S. PATENT DOCUMENTS

| | | | |
|---|---|---|---|
| 2,400,076 | 5/1946 | Dauster | 96/139 |
| 2,400,180 | 5/1946 | Venable | 96/139 |
| 2,887,178 | 5/1959 | Larsson et al. | 55/460 X |
| 3,368,326 | 2/1968 | Hervert | 123/819 X |
| 3,483,677 | 12/1969 | Pinto | 55/337 X |
| 3,722,189 | 3/1973 | Tortellotte | 95/901 X |
| 3,789,582 | 2/1974 | Graybill | 96/139 X |
| 3,798,882 | 3/1974 | Kalen | 55/337 X |
| 3,898,066 | 8/1975 | Miskiewicz | 55/337 X |
| 4,205,971 | 6/1980 | Abthoff et al. | 55/337 X |
| 4,496,379 | 1/1985 | Kazawa | 55/387 |
| 4,504,285 | 3/1985 | Modisette | 55/460 X |
| 4,900,345 | 2/1990 | Le Jeune | 55/337 |
| 5,119,791 | 6/1992 | Gifford et al. | 123/519 |
| 5,286,282 | 2/1994 | Goodell et al. | 96/144 X |
| 5,336,396 | 8/1994 | Shetley | 210/90 |
| 5,501,723 | 3/1996 | Andress et al. | 96/141 X |

FOREIGN PATENT DOCUMENTS

| | | | |
|---|---|---|---|
| 0284164 | 11/1990 | Germany | 96/130 |
| 0284165 | 11/1990 | Germany | 96/144 |
| 54-068776 | 6/1979 | Japan | 96/144 |
| 58-77157 | 5/1983 | Japan | . |
| 60-082119 | 5/1985 | Japan | 96/139 |
| 1813525 | 5/1993 | U.S.S.R. | 96/108 |

*Primary Examiner*—Robert Spitzer
*Attorney, Agent, or Firm*—Jerome R. Drouillard

[57] ABSTRACT

An evaporative emission control system for an automotive vehicle includes a generally cylindrical casing having an adsorption zone containing hydrocarbon adsorbing agent, an antechamber extending within the casing to the adsorption zone, and a swirl inducing inlet passage for conduction of hydrocarbon laden air into the antechamber such that a rotational flow pattern will be established in the antechamber, with the rotational flow having an axis coincident with a longitudinal axis of the generally cylindrical casing.

3 Claims, 2 Drawing Sheets

EVAPORATIVE EMISSIONS CONTROL SYSTEM FOR AUTOMOTIVE VEHICLE

BACKGROUND OF THE INVENTION

1. Field Of The Invention

The present invention relates to an evaporative emissions control system having a canister for processing hydrocarbon-laden air so as to avoid discharge of gasoline vapor to the atmosphere.

2. Disclosure Information

Evaporative emission control systems have been a feature of automotive vehicles for at least 25 years Such systems typically use a canister having carbon in the form of charcoal, or some other form, contained therein. In typical fashion, hydrocarbon-laden air is caused to flow through the canister, where the hydrocarbon is adsorbed onto the carbon within the canister. This is so-called forward flow. To regenerate the canister, ambient air is pulled over the carbon particles within the canister so as to desorb the hydrocarbon material from the charcoal or other form of carbon. This regeneration is called reverse flow. FIGS. 4 and 5 illustrate flow patterns for a typical prior art carbon canister design in which hydrocarbon vapors are introduced via connecting tube 40 into a cylindrical canister 44. Notice that the connecting tube extends into the canister at the canister's centerline and parallel to the centerline. As depicted in FIG. 4, the resulting flow is a toroidal type of flow most visibly characterized by high velocity in the center 46 of the flow and relatively lower velocity in the sides. This is shown more clearly in FIG. 5. In other words, the central part of the canister is heavily utilized for the adsorption and desorption processes, while the outer portions of the active material 42 are underutilized. The present invention avoids this problem by providing a much more even flow distribution across the canister's carbon bed.

SUMMARY OF THE INVENTION

An evaporative emissions control system for an automotive vehicle includes a generally cylindrical casing having an adsorption zone containing hydrocarbon adsorbing agent and an antechamber extending within the casing from the first end of the casing to the adsorption zone. A swirl inducing inlet passage conducts hydrocarbon-laden air into the antechamber such that a rotational flow pattern will be established in the antechamber. The rotational flow may have an axis coincident with the longitudinal axis of the generally cylindrical casing. The swirl inducing inlet produces a desired flow because it extends generally tangentially into the antechamber through the cylindrical wall of the casing. In order to allow purging of the canister, at a very high efficiency, a post chamber extending within the casing from a second end of the casing to the adsorption zone is furnished with purge air by means of a purge inlet which extends tangentially through the cylindrical wall of the casing and into the post chamber. In general, the flow patterns of the air entering the adsorption zone during both forward and reverse flow have axes which are coincident with the longitudinal axis of the generally cylindrical casing.

DETAILED DESCRIPTION AND PREFERRED EMBODIMENTS

Figure 1:
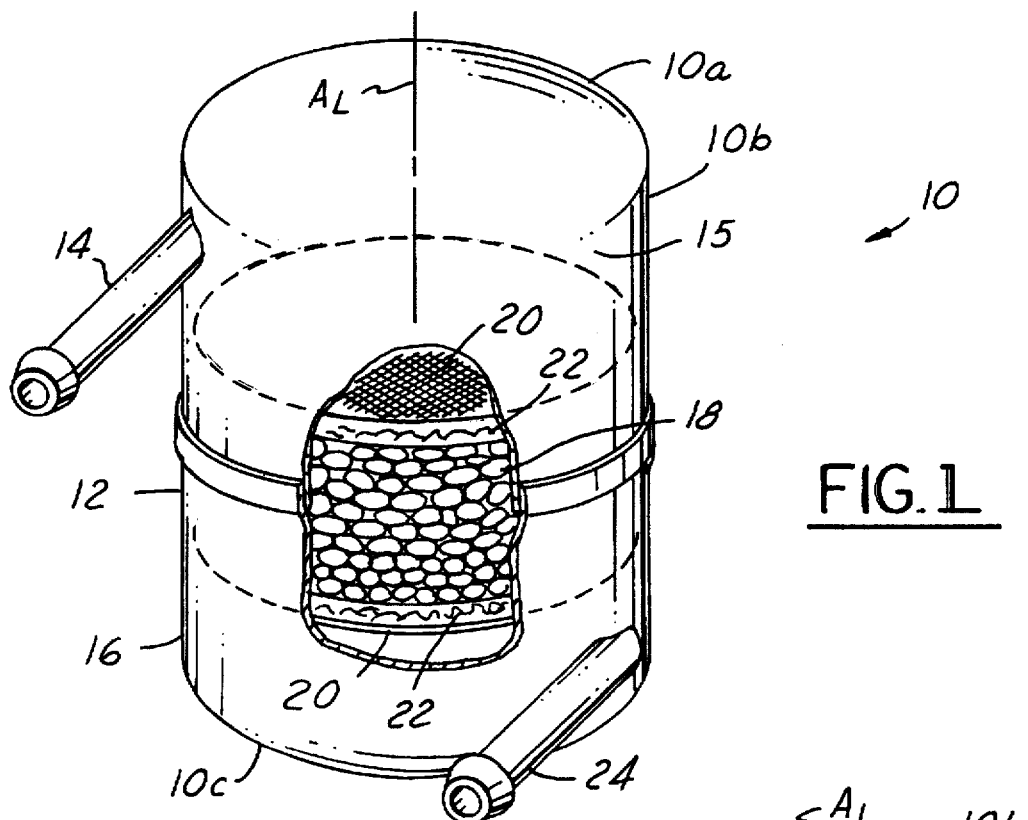
FIG. 1 is a schematic representation of an evaporative emission control system according to the present invention.

As shown in FIG. 1, an evaporative emission control device according to present invention has generally cylindrical casing 10 having adsorption zone 12 positioned therein. Adsorption zone 12 is filled with carbon pellets 18. The pellets are retained in place by foam pads 22 which are located on both ends of adsorption zone 12, as well as by screens 20, which overlay foam pads 22. As noted above, the present invention is intended to allow maximum utilization of adsorption zone 12. To this end, the present inventors have determined that inlet passage 14, which comprises a generally cylindrical tube extending tangentially through cylindrical wall 10b of casing 10 proximate to first end 10a, will cause best utilization of adsorption zone 12.

Figure 2:
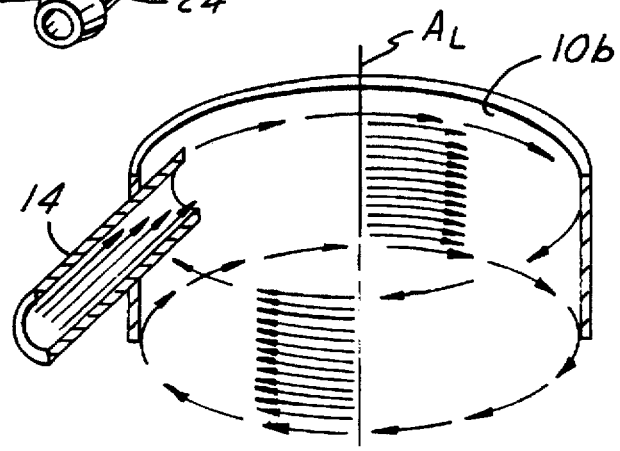
FIG. 2 illustrates flow produced by a system according to the present invention.

As shown in FIG. 2, the tangential entry feature of inlet passage 14 causes an even rotational flow distribution about an axis which is coincident with the longitudinal central axis of generally cylindrical casing 10. The axis of the casing 10 is labeled $A_L$.

Figure 3:
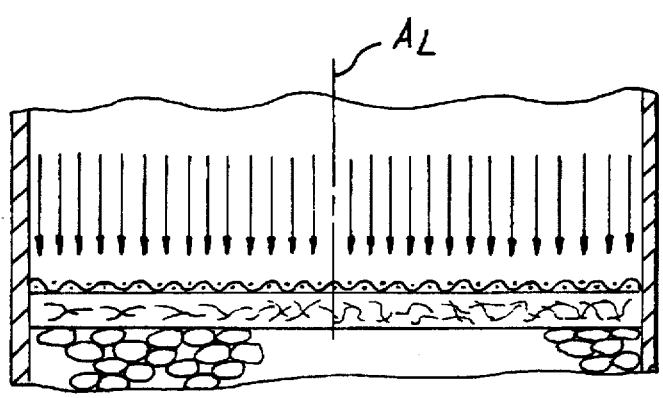
FIG. 3 is a second illustration of substantially invariant axial flow according to the present invention.
Figure 4:
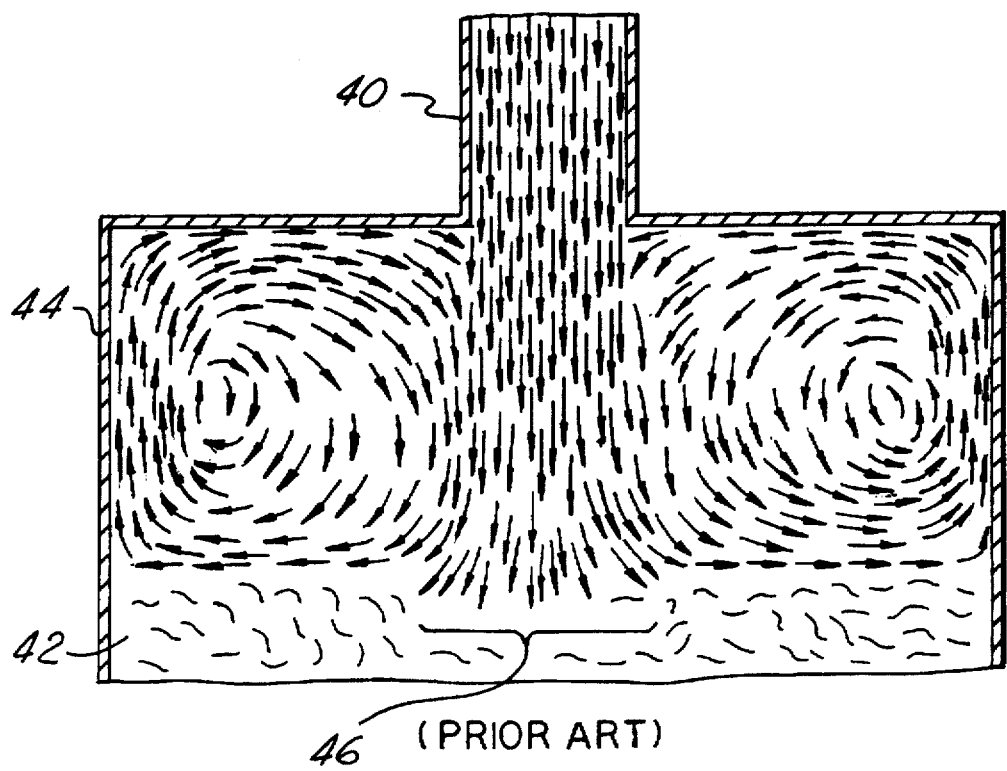
FIGS. 4 and 5 illustrate flows produced in prior art evaporative emission control canisters.
Figure 5:
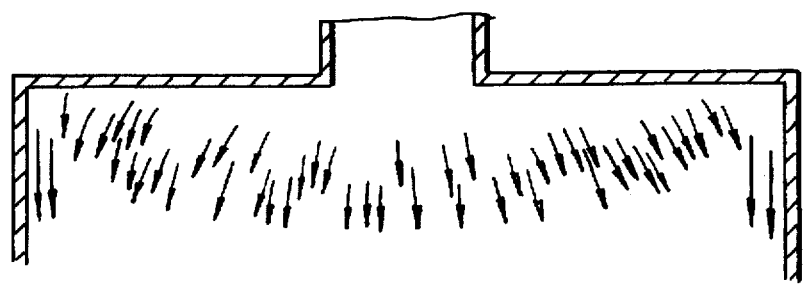

The even rotational flow shown in FIG. 2 results in a substantially invariant axial flow distribution across the planar interface between adsorption zone 12 and antechamber 15. This axial flow is illustrated in FIG. 3. Of course, antechamber 15 is the first chamber of the present device into which the hydrocarbon-laden air flows during forward flow operation. The even axial flow of the present invention may be contrasted with the uneven axial flow shown in FIG. 5 for prior art devices.

The even flow characteristic produced by an air/gas handling system according to the present invention may be used advantageously to purge the present device of hydrocarbon material. Thus, while operating In forward flow, air will normally exit adsorption zone 12 into postchamber 16 and then into purge inlet 24. However, during purging, air entering purge inlet 24 will be subjected to the same type of mixed rotational and axial flow pattern characterized by substantially even axial flow at the interface between post chamber 16 and adsorption zone 12. This relatively even flow velocity distribution across the interface between post chamber 16 and adsorption zone 12 will promote even desorption of hydrocarbon material from carbon particles 18. As shown in FIG. 1, purge inlet passage 24 enters cylindrical wall 10b proximate second end 10c in a tangential fashion which is substantially similar to the entry of inlet passage 14. This causes air entering purge inlet 24 to have even rotational flow about axis $A_L$, the longitudinal central axis of generally cylindrical casing 10.

The inventors of the present invention have determined that an evaporative emission control canister equipped with an antechamber 15 and inlet passage as described and illustrated herein will produce 10% better adsorption of hydrocarbon material. This increase is significant, given the increasing stringency of federal and state motor vehicle pollution control laws.

While the invention has been shown and described in its preferred embodiments, it will be clear to those skilled in the arts to which it pertains that many changes and modifications may be made thereto without departing from the scope of the invention.

We claim:

1. An evaporative emissions control system for an automotive vehicle, comprising:

a generally cylindrical casing having an adsorption zone with a hydrocarbon adsorbing agent contained therein;

an antechamber extending within said casing from a first end of the casing to the adsorption zone, with a planar interface between the adsorption zone and the antechamber; and a swirl inducing, tangentially directed inlet passage for conducting hydrocarbon laden air into the antechamber with an even rotational flow such that a mixed rotational and axial flow pattern having a substantially invariant axial flow velocity distribution is established across the planar interface.

2. An evaporative emissions control system according to claim 1, further comprising a postchamber extending within said casing from a second end of the casing to a planar interface with the adsorption zone; and a purge inlet for allowing purge air to flow into said postchamber and then through the adsorption zone and out through the antechamber and inlet passage, with said purge inlet extending tangentially into the postchamber such that a mixed rotational and axial flow pattern having substantially even axial flow is established at the interface between the postchamber and the adsorption zone.

3. An evaporative emissions control system according to claim 2, wherein said swirl inducing inlet passage and said purge inlet are directed such that the rotational flow patterns of the air entering the adsorption zone during both forward flow and reverse flow have axes which are coincident with a central longitudinal axis of the generally cylindrical casing.

* * * * *